(12) United States Patent
Wang (10) Patent No.: US 11,818,238 B2
(45) Date of Patent: Nov. 14, 2023

(54) LOW OVERHEAD HIGH BANDWIDTH DATA TRANSFER PROTOCOL

(71) Applicant: ADVANCED MICRO DEVICES, INC., Santa Clara, CA (US)

(72) Inventor: Tun-Fen Wang, Santa Clara, CA (US)

(73) Assignee: Advanced Micro Devices, Inc., Santa Clara, CA (US)

( * ) Notice: Subject to any disclaimer, the term of this patent is extended or adjusted under 35 U.S.C. 154(b) by 453 days.

(21) Appl. No.: 16/456,441

(22) Filed: Jun. 28, 2019

(65) Prior Publication Data

US 2020/0412848 A1 Dec. 31, 2020

(51) Int. Cl.
*H04L 69/324* (2022.01)
*H04L 47/12* (2022.01)
*H04L 69/323* (2022.01)
*H04L 1/00* (2006.01)

(52) U.S. Cl.
CPC .......... *H04L 69/324* (2013.01); *H04L 1/0041* (2013.01); *H04L 1/0061* (2013.01); *H04L 47/12* (2013.01); *H04L 69/323* (2013.01); *H04L 2212/00* (2013.01)

(58) Field of Classification Search
None
See application file for complete search history.

(56) References Cited

U.S. PATENT DOCUMENTS

| | | | |
|---|---|---|---|
| 2004/0225808 A1* | 11/2004 | Govindaraman | G06F 13/385 710/305 |
| 2008/0162767 A1* | 7/2008 | Cho | G06F 13/4221 710/305 |
| 2009/0177906 A1* | 7/2009 | Paniagua, Jr. | G06F 1/26 713/340 |
| 2014/0126612 A1* | 5/2014 | Tresidder | G06F 13/4273 375/145 |
| 2014/0255029 A1* | 9/2014 | Varanese | H04L 5/0048 398/66 |
| 2016/0373557 A1* | 12/2016 | Sikkink | H04L 1/0061 |

* cited by examiner

*Primary Examiner* — Adnan Baig (57) ABSTRACT

A processing system includes a controller of a transmitting module for transmitting data to a receiving module across an interconnect compliant with a processor interconnect protocol. The controller indicates the beginning and end of a variable-length data burst using data primitives that are N symbols (bytes) in length, rather than using data primitives that are M symbols in length, as specified by the processor interconnect protocol, where N<M. The controller of the transmitting module signals the beginning of a data burst by sending a short primitive indicating either the beginning of a data burst or signaling the receiving module to reset error detection logic so that error detection information based on the data burst can be calculated. The controller automatically inserts another short primitive indicating the end of a data burst when there is no data to transmit, thus accommodating data bursts of variable lengths.

20 Claims, 4 Drawing Sheets

LOW OVERHEAD HIGH BANDWIDTH DATA TRANSFER PROTOCOL

BACKGROUND

To support processing and other operations, processing systems often transfer data from one component to another. These transfers typically occur over a high-speed communication link such as Peripheral Component Interconnect Express (PCIe), Serial Advanced Technology Attachment (SATA), or Universal Serial Bus (USB) interconnects, which provide two differential pairs in each direction point-to-point communication links between components in the processing system. Each of the different types of interconnects employs a protocol for data transfer that has been widely adopted. However, the PCIe, SATA, and USB processor interconnect protocols consume a relatively high percentage of the total data package overhead, which includes, e.g., transaction layer packet overhead, link protocol overhead, and flow control protocol overhead. Also, each of the PCIe, SATA, and USB protocols use four symbols for each data primitive to signal the beginning or end of a data burst. In addition, the PCIe protocol supports data packets of up to 1 kb size but does not support larger data packet sizes. Thus, the PCIe, SATA, and USB protocols suffer from a high overhead-to-packet size ratio, reducing the effective bandwidth of data transfers.

BRIEF DESCRIPTION OF THE DRAWINGS

The present disclosure may be better understood, and its numerous features and advantages made apparent to those skilled in the art by referencing the accompanying drawings. The use of the same reference symbols in different drawings indicates similar or identical items.

DETAILED DESCRIPTION

FIGS. 1-6 illustrate techniques for transmitting data across an interconnect between a transmitting module and a receiving module of a processing system using a protocol that indicates the beginning and end of a variable-length data burst using data primitives that are only two symbols (bytes) in length. The transmitting module includes a controller that signals the beginning of a data burst by sending a short (e.g., two-byte) primitive indicating either the beginning of a data burst (i.e., a start data primitive, or "STRDATA") or signaling the receiving module to reset error detection logic (i.e., a start cyclical redundancy check primitive, or "STRCRC") so that error detection information based on the data burst can be calculated. The controller automatically inserts another short (e.g., two-symbol) primitive indicating the end of a data burst (i.e., an end data primitive, or "ENDDATA") when there is no data to transmit, thus accommodating data bursts of variable lengths. The controller transmits a stream of scrambled logic idle symbols following the ENDDATA primitive until there is additional data to transmit. When there is additional data to transmit, the controller indicates the start of a new data package by transmitting another STRDATA or STRCRC two-symbol primitive. Thus, either the STRDATA or STRCRC primitive leads the data burst, and either the ENDDATA or ENDCRC primitive ends the data burst. In this way, the data burst has a variable length and is encapsulated by defined short primitives. Because the data primitives that lead and end the data burst have a relatively small number of bytes, and because the data burst has a variable length that can exceed the lengths of data bursts under the PCIe and USB processor interconnect protocols, the present protocol has a lower overhead-to-data ratio.

Figure 1:
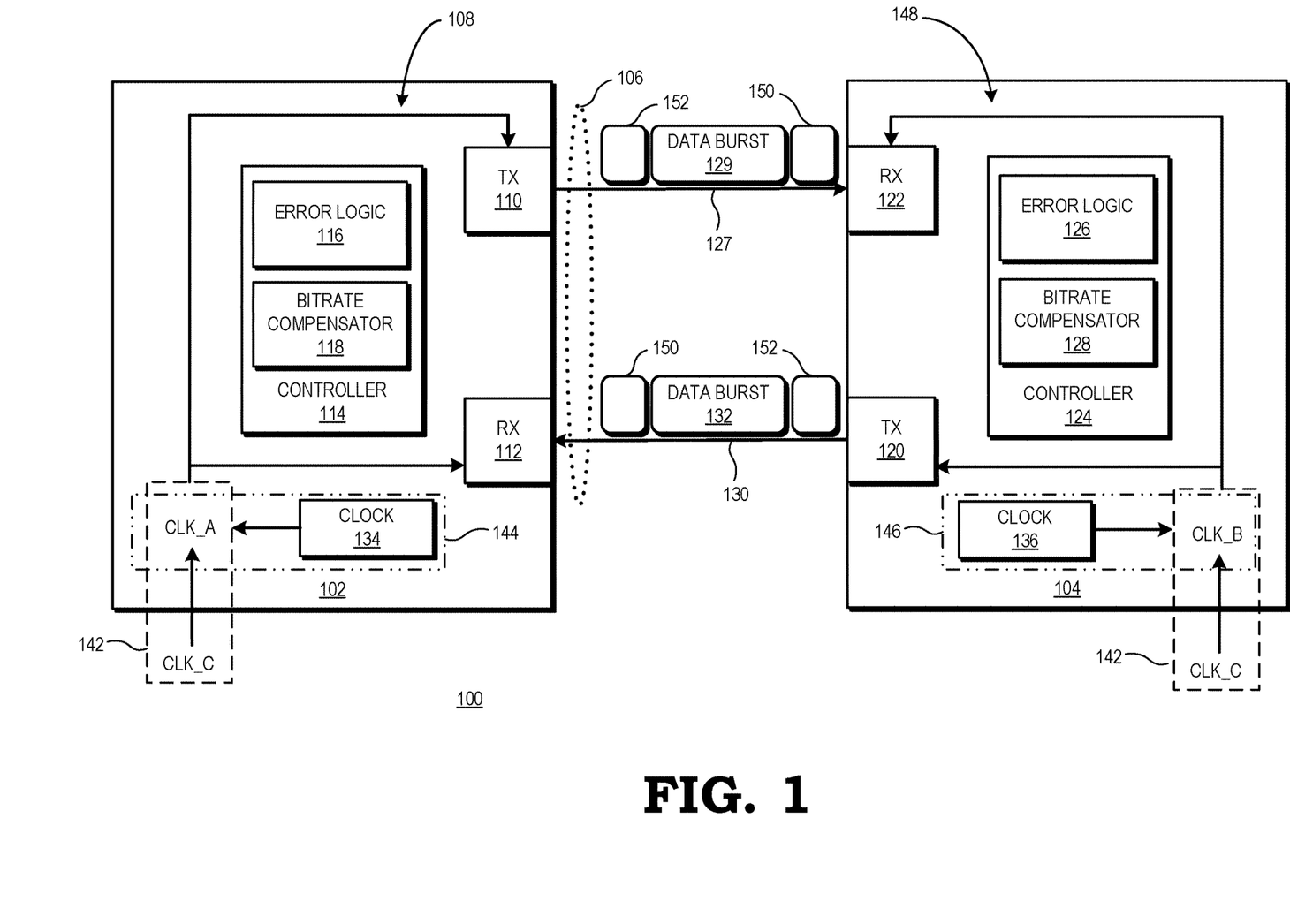
FIG. 1 is a block diagram of a processing system employing a low-overhead high-bandwidth transfer protocol for end-to-end high-speed data transmission in accordance with some embodiments.

FIG. 1 illustrates a processing system 100 employing a low-overhead high-bandwidth transfer protocol for end-to-end high-speed data transmission in accordance with some embodiments. The processing system 100 includes modules 102 and 104 connected via an interconnect 106. The modules 102 and 104 can include any of a variety of modules that communicate information via serial or parallel transmission links, such as central processing units (CPUs), graphical processing units (GPUs) and other processors, peripheral components, such as add-on boards, storage devices, and the like. The interconnect 106 can include any of a variety of interconnects that provide high-speed data transmission, such as interconnects compliant with one or more of the PCIe, SATA, or USB specifications, and the like. For example, the module 102 can include a processor or other component on a motherboard and the module 104 can include another processor or other component on the motherboard, an add-on board, flash memory device, or other peripheral component connected to the motherboard via a PCIe expansion slot. As another example, the modules 102 and 104 can include field replaceable units (FRUs) or server blades connected via a PCIe-based backplane (one example of the interconnect 106). As yet another example, the module 102 can include a notebook computer and the module 104 can include a flash storage device, and the interconnect 106 can include a USB cable connecting the flash storage device to the motherboard. In some embodiments, the processing system 100 is distributed across a variety of electronic devices, such as a server, personal computer, tablet, set top box, gaming system, mobile phone, and the like.

In the depicted example, the module 102 includes a bus interface 108 including a transmitter interface 110, a receiver interface 112, and a controller 114 including error logic 116 and a bitrate compensator 118. The module 104 is similarly configured and includes a bus interface 148, a transmitter interface 120, a receiver interface 122, and a controller 124 including error logic 126 and a bitrate compensator 128. The controllers 114, 124, error logics 116, 126, and bitrate compensators 118, 128 may be implemented as hard-coded logic, programmable logic, software executed by a processor, or a combination thereof.

The transmitter interface 110 includes an input (not shown) to receive data from the upper layer (not shown) of the module 102 to be transmitted and an output coupled to a lane 127 of the interconnect 106, whereby the transmitter interface 110 transmits the data to the receiver interface 122 of the module 104 as a data burst 129 via the lane 127. In some embodiments, the lane 127 is a high-speed differential line. Similarly, the transmitter interface 120 includes an input (not shown) to receive data to be transmitted and an output coupled to a lane 130 of the interconnect 106, whereby the transmitter interface 120 transmits the data to the receiver interface 112 of the module 102 as a data burst 132 via the lane 130. As such, the bus interface 108 is "transmit-side" relative to data burst 129 and "receive-side" relative to data burst 132, whereas the bus interface 148 is "transmit-side" relative to data burst 132 and "receive-side" relative to data burst 129.

To signal the beginning of a data burst 129, the controller 114 signals the transmitter interface 110 to transmit a two-symbol (i.e., two-byte) primitive 150 to the receiver interface 122. In some embodiments, the two-symbol primitive 150 is either a STRDATA primitive or a STRCRC primitive. Following transmission of the STRDATA or STRCRC primitive 150 by the transmitter interface 110, the controller 114 signals the transmitter interface 110 to transmit the data burst 129 to the receiver interface 122. In some embodiments, the amount of data for each data burst 129 can vary. In some embodiments, the data burst 129 includes up to 8K bytes of scrambled data, which is descrambled after being received at the receiver interface 122. When the upper layer has no more data to transmit, the controller 114 signals the transmitter interface 110 to transmit a two-symbol ENDDATA primitive 152 to the receiver interface 122 to indicate the end of the data burst. Following transmission of the two-symbol ENDDATA primitive 152, the controller 114 signals the transmitter interface 110 to transmit a stream of logic idle symbols scrambled by a logic idle scrambler (not shown) to the receiver interface 122. The logic idle scrambler is a module that may be implemented as hard-coded logic, programmable logic, software executed by a processor, or a combination thereof that scrambles the logic idle symbols to keep the high-speed differential lane 127 DC balanced. In some embodiments, the stream of logic idle symbols includes scrambled 00h symbols. When the upper layer has more data to transmit, the controller 114 signals the transmitter interface 110 to stop transmitting logic idle symbols, and to transmit the two-symbol STRDATA primitive 150 to indicate the start of a next data burst, followed by the scrambled data. Similarly, to signal the beginning and end of data burst 132, the transmitter interface 120 "encapsulates" the data burst 132 with a two-symbol primitive 150 (either STRDATA or STRCRC) and a two-symbol primitive 152 (either ENDDATA or ENDCRC). The description that follows regarding the transmitter interface 110 transmitting the data burst 129 to the receiver interface 122 also applies to the transmitter 120 transmitting the data burst 132 to the receiver interface 112.

If the two-symbol primitive 150 used to signal the beginning of the data burst 129 is a STRCRC primitive, the controller 114 resets error logic 116 and the controller 124 resets error logic 126. The error logic 116 and the error logic 126 periodically calculate an error check, such as a cyclical redundancy checksum (CRC), to verify the integrity of the data burst 129. In some embodiments, the CRC data is 32 bits, and is calculated in data byte increments of 0.5K, 1K, 4K, or 8K. When an increment of the data burst 129 for calculation of an error check has been transmitted to the receiver interface 122, the controller 114 signals the transmitter interface 110 to transmit a two-symbol ENDCRC primitive (not shown) to the receiver interface 122. After transmitting the ENDCRC primitive, the transmitter interface 110 transmits the scrambled CRC data calculated by the error logic 116, which is descrambled after being received at the receiver interface 122. The error logic 126 compares the descrambled CRC data that was calculated by the error logic 116 to the CRC data that was calculated by the error logic 126 to detect whether there are any errors in the data burst 129.

In some embodiments, the transmitter interface 110 uses a transmit clock signal based on a local clock signal (denoted "CLK_A" in FIG. 1) to transmit the data stream 128 and the receiver interface 112 uses a CDR (clock data recovery) scheme to generate a recovered clock and retrieve the data stream 132 once received. The local clock signal CLK_A may be generated by a local clock source 134 (e.g., a crystal oscillator) or derived from a distributed clock signal (denoted "CLK_C" in FIG. 1) via a phase locked loop (PLL) or other clock synchronization device. For example, the data transmission system 100 can include a motherboard with PCIe expansion slots and the distributed clock signal CLK_C can include, for example, a clock signal distributed across the motherboard to various PCIe expansion slots. The clock signal CLK_A may be generated by, for example, frequency spreading the distributed clock signal CLK_C at the transmitter interface 110 to generate a spread spectrum clock signal used as the clock signal CLK_A. With reference to the module 104, the transmitter interface 120 uses a transmit clock signal based on a local clock signal (denoted "CLK_B" in FIG. 1) to transmit the data burst 132 and the receiver interfaces 122 uses a CDR (clock data recovery) scheme to generate a recovered clock and retrieve the received data burst 129. The local clock signal CLK_B may be generated by a local clock source 136 or derived from the distributed clock signal CLK_C.

Ideally, the clock signals CLK_A and CLK_B used by the bus interfaces 108 and 148 would have the exact same frequency and thus be perfectly synchronized. However, in practical applications, there typically is a non-trivial clock frequency mismatch between the transmit side and the receive side of an interconnect due to both physical limitations and tolerance mismatches in the clock signal sources, as well as the use of certain techniques, such as spread spectrum clocking. To illustrate, the PCIe specification provides that, in the absence of spread spectrum clocking, the local clock signals used by the PCIe hosts (that is, the bus interfaces 108 and 148) should be 100 megahertz (MHz) with an accuracy of at least +/−300 parts per million (ppm), and thus have the same clock domain 142. However, the PCIe specification also allows for spread spectrum clocking, which down-spreads the local clock signal using a modulation signal having a frequency of up to 33 kilohertz (kHz), with a resulting accuracy requirement of at least +/−5000 ppm. Moreover, the PCIe specification permits the transmit side and receive side of a data stream to be clocked independently, that is, to have separate clock domains 142, 146, respectively, particularly if the two sides are in different physical systems. Thus, for a data stream transmitted with both the transmit and receive sides each implementing spread spectrum clock signals in separate clock domains 144, 146, the bus interface will need to tolerate an accuracy of at least 5600 ppm since the slower clock signal can be on either side of the link.

In view of the potential for clock frequency mismatch, each of the transmitter interfaces 110 and 120 inserts clock mismatch compensation symbols into a data burst or stream of logic idle symbols to facilitate receiver buffer overflow/underflow control due to clock frequency mismatch. For ease of illustration, the techniques of the present disclosure are described in an example context of skip ordered sets as clock mismatch compensation symbols. However, the disclosed techniques can be implemented with any of a variety of clock mismatch compensation symbols, and thus reference herein to "skip ordered sets" applies to other types of clock mismatch compensation symbols or characters unless otherwise noted.

Thus, the transmitter interfaces 110 and 120 insert skip ordered sets into their respective transmitted data streams to allow the receiver interfaces 112 and 122 to compensate for any clock frequency mismatch. For example, the PCIe specification implements a skip ordered set (also referred to as SKPOS) as physical layer packets having a COM character followed by three SKP characters. The bitrate compensator 118 inserts skip ordered sets at a fixed or variable rate into a transmitted data burst (or into a stream of logic idle symbols), such that the skip ordered sets can be dropped from the data burst or buffered in an elastic buffer at the receiver side to prevent buffer underflow. For example, in some embodiments, the bitrate compensator 118 inserts a skip ordered set primitive every 1528 symbols. The bitrate compensation can include storing skip ordered symbols in addition to the received skip ordered sets in the elastic buffer of the receiver interface to prevent buffer underflow when the receive-side clock frequency is greater than the transmit-side clock frequency. The bitrate compensation alternatively can include deleting skip ordered sets from the elastic buffer, or otherwise deleting them from the data burst, to prevent buffer overflow when the transmit-side clock frequency is greater than the receive-side clock frequency.

By encapsulating the data bursts 128, 132 with two-symbol STRDATA/STRCRC and ENDDATA/ENDCRC primitives and allowing data bursts to have variable lengths up to 8K bytes, the controllers 114, 124 reduce the overhead of high-speed data transmissions between the modules 102 and 104, increasing the efficiency of data transfers. To illustrate, whereas the packet efficiency of data transfers made in accordance with the PCIe specification (which uses four-symbol primitives and has a maximum data packet size of 1K byte) is between 85% and 98%, depending on the data packet size, the efficiency of data transfers using two-symbol primitives and variable data bursts up to 8K bytes in accordance with some embodiments is over 98%. For example, Table 1 below illustrates the packet efficiencies of data bursts of 512 and 8192 bytes, respectively:

TABLE 1

Packet Efficiency

| Data size | Calculation | Packet Efficiency (%) |
|---|---|---|
| 512 | 512/(512 + 4 CRC + 4 encapsulate primitive) = 0.9846 | 98 |
| 8192 | 8192/(8192 + 4 CRC + 4 encapsulate + 4 × 4 SKPOS) = 0.997 | 99.7 |

Figure 2:
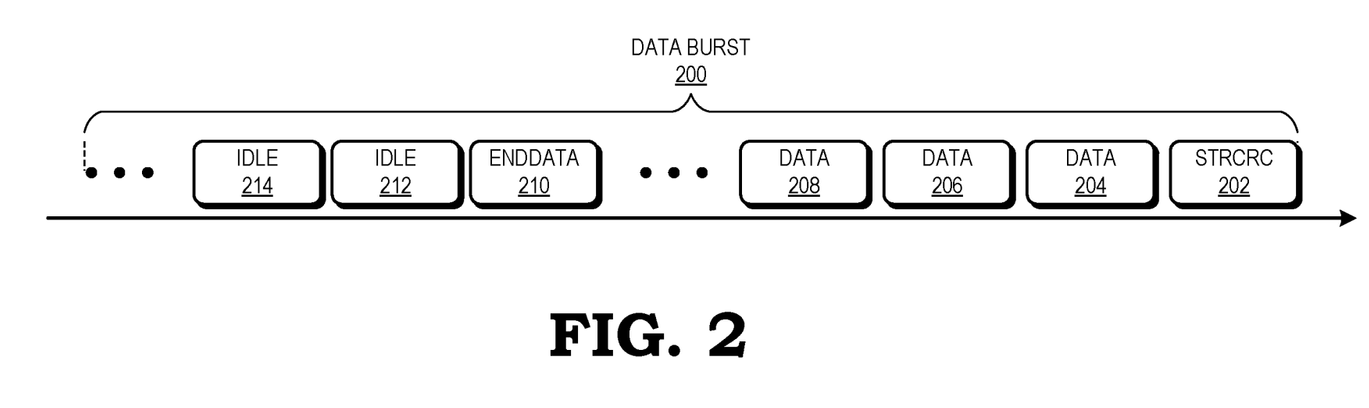
FIG. 2 illustrates a variable-length data burst encapsulated by two-symbol primitives in accordance with some embodiments.

FIG. 2 illustrates a variable-length data burst 200 encapsulated by two-symbol primitives in accordance with some embodiments. When the upper layer has data to transmit from the module 102 to the module 104 of FIG. 1, the controller 114 signals the transmitter interface 110 to transmit a two-symbol STRCRC primitive 202 to the receiver interface 122. In some embodiments, the STRCRC primitive 202 is encoded as follows:

| Primitive | Symbol 1 | Symbol 0 |
|---|---|---|
| STRCRC | D23.1 | K28.3 |

In response to receiving the STRCRC primitive 202, the error logic 126 resets so that a new CRC can be calculated based on the incoming data burst.

Following the STRCRC primitive 202, the transmitter interface 110 transmits scrambled data 204, 206, 208, etc. until the upper layer has no more data to transmit. In response to the upper layer having no more data to transmit, the controller 114 automatically signals the transmitter interface 110 to transmit a two-symbol ENDDATA primitive 210 indicating the end of the data burst to the receiver interface 122. In some embodiments, the ENDDATA primitive 210 is encoded as follows:

| Primitive | Symbol 1 | Symbol 0 |
|---|---|---|
| ENDDATA | D21.7 | K28.3 |

After transmitting the ENDDATA primitive 210, the controller 114 signals the transmitter interface 110 to transmit a stream of logic idle symbols 212, 214. In some embodiments, the logic idle symbols 212, 214 are scrambled to keep the high-speed differential lane 127 DC balanced.

Figure 3:
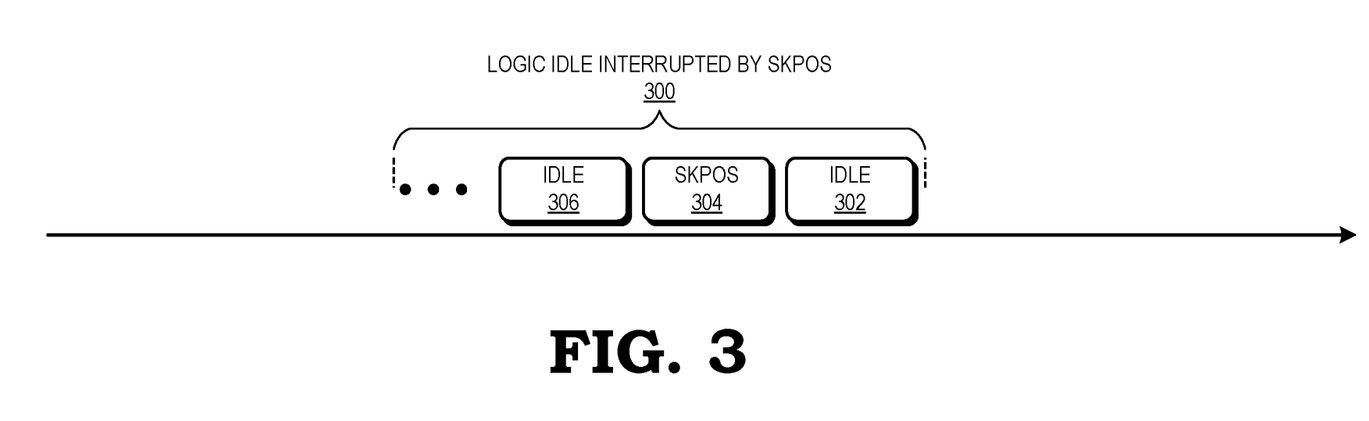
FIG. 3 illustrates a logical idle interrupted by a bitrate mismatch compensation primitive in accordance with some embodiments.

FIG. 3 illustrates a stream of logic idle symbols interrupted by a bitrate mismatch compensation primitive (SKPOS) 300 in accordance with some embodiments. When the upper layer has no data to transmit, the controller 114 signals the transmitter interface 110 to transmit a stream of scrambled logic idle symbols 302. To compensate for any clock frequency mismatch between the transmitter interface 110 and the receiver interface 122, the bitrate compensator 118 inserts a bitrate mismatch compensation primitive (e.g., a skip ordered set, or SKPOS) 304 at a fixed or variable rate into the stream of logic idle symbols. For example, in some embodiments, the bitrate compensator 118 inserts a skip ordered set primitive once every 1528 symbols. In some embodiments, the SKPOS primitive is encoded as follows:

| Symbol Number | Encoded value | Description |
|---|---|---|
| 0 | K28.5 | COM for symbol alignment |
| 1-3 | K28.0 | Used to compensate different bit rates for two link partners |

When the bitrate compensator 118 inserts the SKPOS 304 into the stream of logic idle symbols 302, the logic idle scrambler (not shown) is reset. Following transmission of the SKPOS primitive 304, the controller 114 signals the transmitter interface 110 to resume transmitting scrambled logic idle symbols 306 until additional data is available for transmission from the upper layer.

Figure 4:
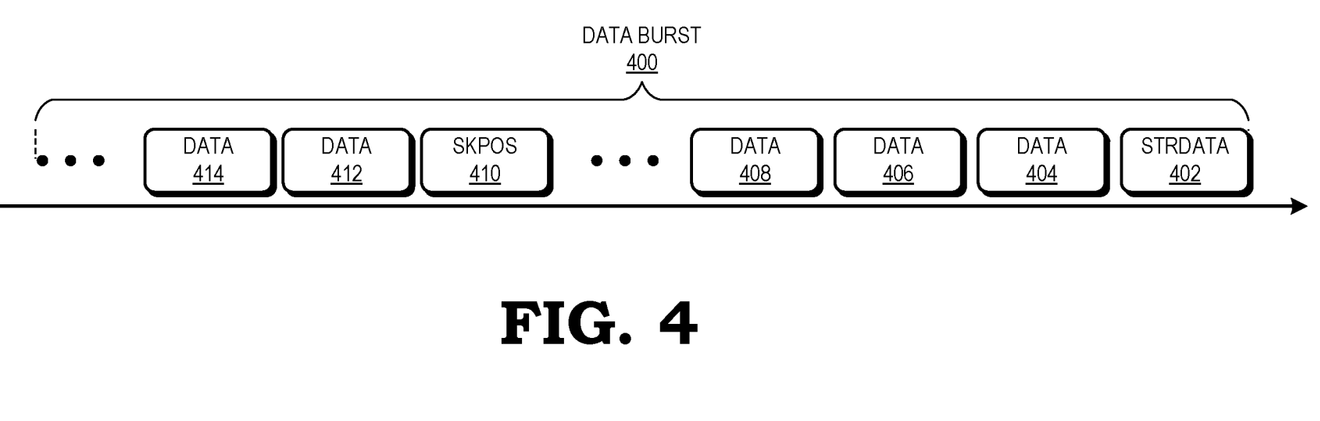
FIG. 4 illustrates a data burst interrupted by a bitrate mismatch compensation primitive in accordance with some embodiments.

FIG. 4 illustrates a data burst 400 interrupted by a bitrate mismatch compensation primitive (SKPOS) in accordance with some embodiments. When the upper layer has data to transmit, the controller 114 signals the transmitter interface 110 to transmit a two-symbol STRDATA primitive 402 to the receiver interface 122 to indicate the beginning of a data burst. In some embodiments, the STRDATA primitive 402 is encoded as follows:

| Primitive | Symbol 1 | Symbol 0 |
|---|---|---|
| STRDATA | D21.4 | K28.3 |

Following transmission of the STRDATA primitive 402, the controller 114 signals the transmitter interface 110 to transmit scrambled data 404, 406, 408, etc. To compensate for any clock frequency mismatch between the transmitter interface 110 and the receiver interface 122, the bitrate compensator 118 inserts a bitrate mismatch compensation primitive (e.g., a skip ordered set, or SKPOS) 410 at a fixed or variable rate into the data stream. For example, in some embodiments, the bitrate compensator 118 inserts a skip ordered set primitive SKPOS 410 once every 1528 symbols. Following transmission of the SKPOS primitive 410, the controller 114 signals the transmitter interface 110 to resume transmitting scrambled data 412, 414, etc.

Figure 5:
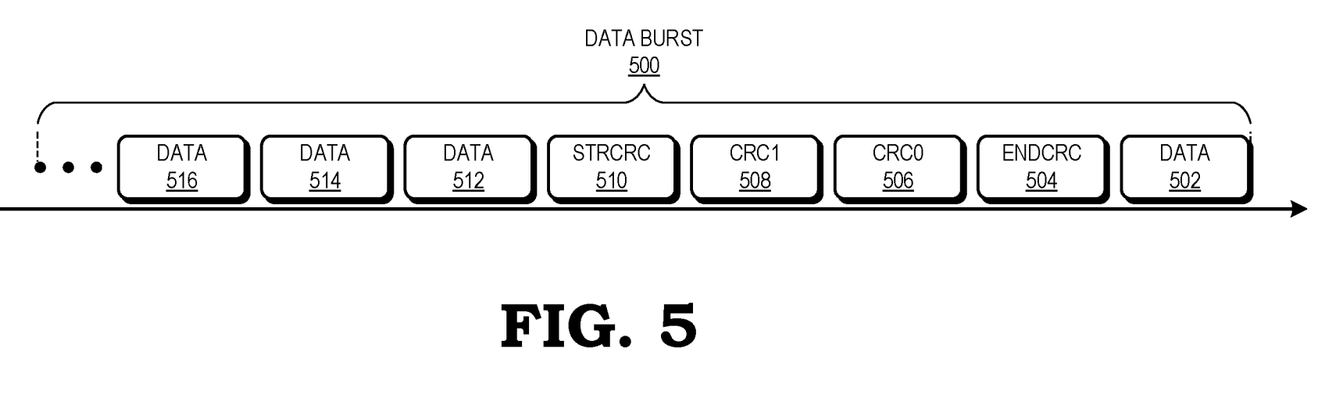
FIG. 5 illustrates error detection primitives inserted in a data burst in accordance with some embodiments.

FIG. 5 illustrates error detection primitives inserted in a data burst 500 in accordance with some embodiments. Following transmission of scrambled data 502, the controller 114 signals the transmitter interface 110 to transmit a two-symbol ENDCRC primitive 504 to the receiver interface 122. The ENDCRC primitive 504 indicates to the receiver interface 122 that the next four bytes transmitted by the transmitter interface 110 will be the scrambled error detection (e.g., CRC) data calculated by the error logic 116. In some embodiments, the ENDCRC primitive 504 is encoded as follows:

| Primitive | Symbol 1 | Symbol 0 |
|---|---|---|
| ENDCRC | D21.6 | K28.3 |

After transmitting the ENDCRC primitive 504, the controller 114 signals the transmitter interface 110 to transmit the scrambled CRC data CRC0 506 and CRC1 508 calculated by the error logic based on the data 502 to the receiver interface 122. The receiver interface 122 descrambles the scrambled CRC data CRC0 506 and CRC1 508, and the error logic 126 compares the descrambled CRC data that was calculated by the error logic 116 to the CRC data that was calculated by the error logic 126 to detect whether there are any errors in the data burst 500. The error logic 126 logs any detected errors. In some embodiments, if the upper layer determines that more than a threshold number of errors have been detected within a given period of time, the upper layer determines whether to perform link retraining or lower the link speed. The controller 114 then signals the transmitter interface 110 to transmit a two-symbol STRCRC primitive 510 to the receiver interface 122 to indicate the beginning of a new data burst and to signal the error logic 126 to reset. Following transmission of the STRCRC primitive 510, the controller 114 signals the transmitter interface 110 to transmit the next data burst 512, 514, 516, etc.

Figure 6:
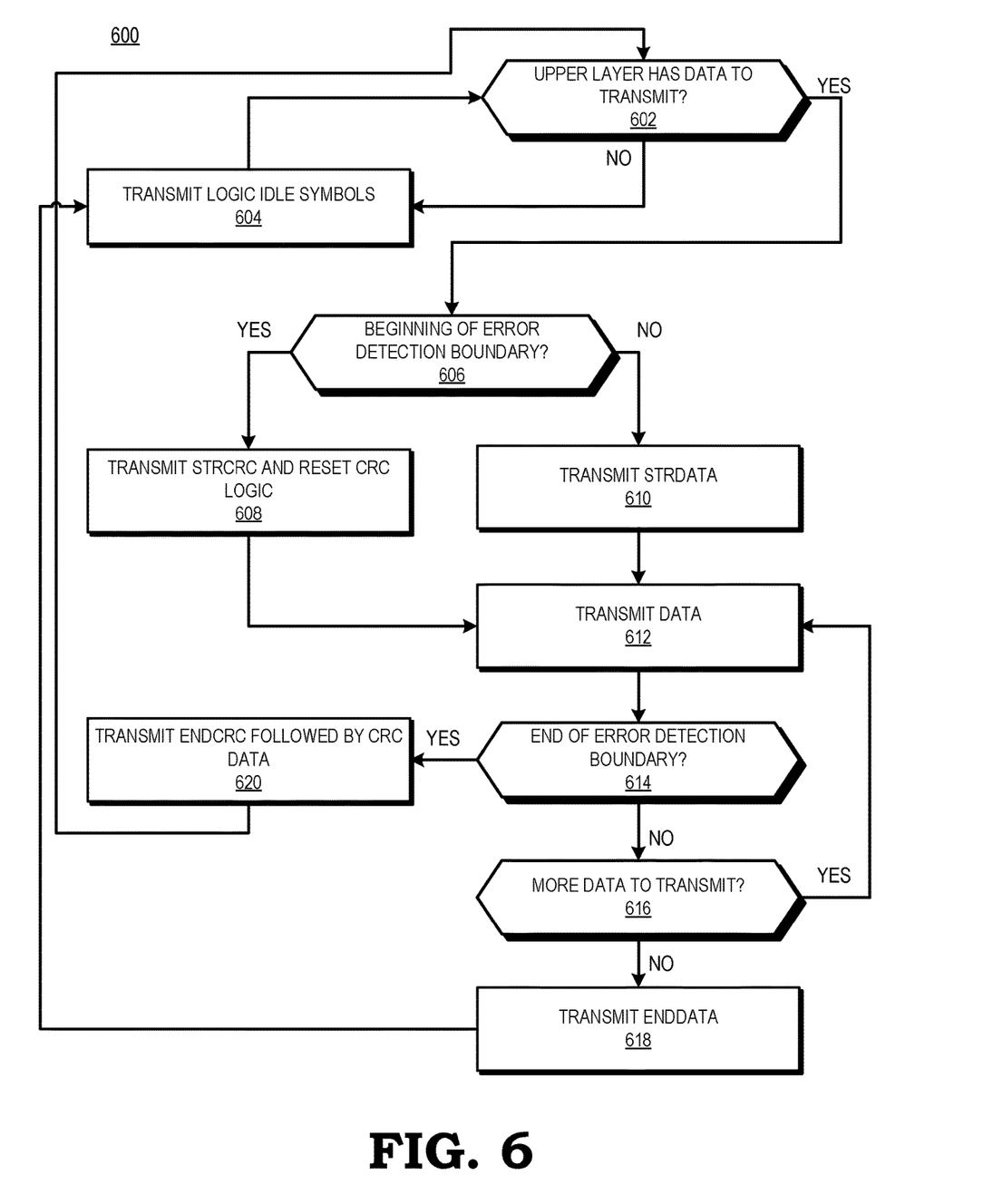
FIG. 6 is a flow diagram illustrating a method for encapsulating a variable-length data burst with two-symbol primitives and error checking the data burst in accordance with some embodiments.

FIG. 6 is a flow diagram illustrating a method 600 for encapsulating a variable-length data burst with two-symbol primitives and error checking the data burst in accordance with some embodiments. The method 600 is implemented in some embodiments of the processing system 100 shown in FIG. 1. At block 602, the controller 114 determines whether the upper layer of the module 102 has data to transmit to the module 104. If, at block 602, the controller 114 determines that the upper layer of the module 102 does not have data to transmit to the module 104, the method flow continues to block 604. At block 604, the controller 114 signals the transmitter interface 110 to transmit a stream of logic idle symbols to the receiver interface 122. In some embodiments, the stream of logic idle symbols is scrambled by a logic idle scrambler. The method flow then continues back to block 602.

If, at block 602, the controller 114 determines that the upper layer of the module 102 has data to transmit to the module 104, the controller 114 determines whether it is the beginning of an error detection boundary. In some embodiments, the controller 114 determines whether it is the beginning of an error detection boundary by querying the error logic 116. If, at block 606, the controller 114 determines that it is the beginning of an error detection boundary, the method flow continues to block 608. At block 608, the controller 114 signals the transmitter interface 110 to lead the data burst 129 with a two-symbol STRCRC primitive and resets the error logic 116 so that new error detection data can be calculated for the upcoming data burst 129. In response to receiving the STRCRC primitive, the error logic 126 also resets so that new error detection data can be calculated at the module 104 for the upcoming data burst. The method flow then continues to block 612.

If, at block 606, the controller 114 determines that it is not the beginning of an error detection boundary, the method flow continues to block 610. At block 610, the controller 114 signals the transmitter interface 110 to transmit a STRDATA primitive. The method flow continues to block 612. At block 612, the controller 114 signals the transmitter interface 110 to transmit the data burst 129. In some embodiments, the data burst 129 includes scrambled data so that the differential transmission lane 127 remains DC balanced. At block 614, the controller 114 determines whether it is the end of an error detection boundary. If, at block 614, the controller 114 determines that it is not the end of the error detection boundary, the method flow continues to block 616. At block 616, the controller 114 determines whether the upper layer has additional data to transmit. If, at block 616, the controller 114 determines that the upper layer has additional data to transmit, the method flow continues back to block 612. If, at block 616, the controller 114 determines that the upper layer does not have additional data to transmit, the method flow continues to block 618. At block 618, the controller 114 signals the transmitter interface 110 to indicate the end of the data burst by transmitting a two-symbol ENDDATA primitive to the receiver interface 122.

At block 614, if the receiver interface 122 determines that it is the end of the error detection boundary, the method flow continues to block 620. At block 620, the controller 114 signals the transmitter interface 110 to transmit an ENDCRC primitive followed by scrambled error detection data (e.g., scrambled CRC data) calculated by the error logic 116 based on the data burst 129 to the receiver interface 122. In response to receiving the ENDCRC primitive and the scrambled error detection data, the receiver interface 122 descrambles the scrambled error detection data calculated by the error logic 116 and the controller 124 compares the descrambled error detection data calculated by the error logic 116 to error detection data calculated by the error logic 126 based on the data burst 129. The method flow then continues back to block 602. Failure by the transmitter interface 110 to transmit a periodic SKPOS implies that the transmitter interface 110 is offline.

A computer readable storage medium may include any non-transitory storage medium, or combination of non-transitory storage media, accessible by a computer system during use to provide instructions and/or data to the computer system. Such storage media can include, but is not limited to, optical media (e.g., compact disc (CD), digital versatile disc (DVD), Blu-Ray disc), magnetic media (e.g., floppy disc, magnetic tape, or magnetic hard drive), volatile memory (e.g., random access memory (RAM) or cache), non-volatile memory (e.g., read-only memory (ROM) or Flash memory), or microelectromechanical systems (MEMS)-based storage media. The computer readable storage medium may be embedded in the computing system (e.g., system RAM or ROM), fixedly attached to the computing system (e.g., a magnetic hard drive), removably attached to the computing system (e.g., an optical disc or Universal Serial Bus (USB)-based Flash memory), or coupled to the computer system via a wired or wireless network (e.g., network accessible storage (NAS)).

In some embodiments, certain aspects of the techniques described above may implemented by one or more processors of a processing system executing software. The software includes one or more sets of executable instructions stored or otherwise tangibly embodied on a non-transitory computer readable storage medium. The software can include the instructions and certain data that, when executed by the one or more processors, manipulate the one or more processors to perform one or more aspects of the techniques described above. The non-transitory computer readable storage medium can include, for example, a magnetic or optical disk storage device, solid state storage devices such as Flash memory, a cache, random access memory (RAM) or other non-volatile memory device or devices, and the like. The executable instructions stored on the non-transitory computer readable storage medium may be in source code, assembly language code, object code, or other instruction format that is interpreted or otherwise executable by one or more processors.

Note that not all of the activities or elements described above in the general description are required, that a portion of a specific activity or device may not be required, and that one or more further activities may be performed, or elements included, in addition to those described. Still further, the order in which activities are listed are not necessarily the order in which they are performed. Also, the concepts have been described with reference to specific embodiments. However, one of ordinary skill in the art appreciates that various modifications and changes can be made without departing from the scope of the present disclosure as set forth in the claims below. Accordingly, the specification and figures are to be regarded in an illustrative rather than a restrictive sense, and all such modifications are intended to be included within the scope of the present disclosure.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims. Moreover, the particular embodiments disclosed above are illustrative only, as the disclosed subject matter may be modified and practiced in different but equivalent manners apparent to those skilled in the art having the benefit of the teachings herein. No limitations are intended to the details of construction or design herein shown, other than as described in the claims below. It is therefore evident that the particular embodiments disclosed above may be altered or modified and all such variations are considered within the scope of the disclosed subject matter. Accordingly, the protection sought herein is as set forth in the claims below.

What is claimed is:

1. A method, comprising: signaling a beginning of a transmission of a data burst from a first module of a processing system to a second module of the processing system coupled via an interconnect compliant with a first processor interconnect protocol by transmitting a first primitive having a first number of symbols from the first module to the second module; and signaling an end of the transmission of the data burst by transmitting a second primitive having the first number of symbols from the first module to the second module; wherein the first processor interconnect protocol uses a second number of symbols to signal a beginning of a data burst and uses the second number of symbols to signal an end of the data burst, and wherein the first number of symbols is less than the second number of symbols.

2. The method of claim 1, wherein the first primitive comprises one of a start data primitive and a start error detection primitive.

3. The method of claim 2, further comprising resetting error detection logic at the first module and at the second module in response to the first module transmitting a start error detection primitive to the second module.

4. The method of claim 1, wherein the second primitive comprises one of an end data primitive and an end error detection primitive.

5. The method of claim 4, further comprising:
transmitting first error detection information formed using the data burst from the first module to the second module in response to the first module transmitting an end error detection primitive to the second module;
calculating second error detection information using the data burst at the second module; and
comparing the first and second error detection information to detect errors in the data burst.

6. The method of claim 1, further comprising:
periodically inserting a bitrate mismatch compensation primitive into the data burst; and
in response to the bitrate mismatch compensation primitive indicating that a bitrate frequency of the first module exceeds a bitrate frequency of the second module, removing at least one entry of the bitrate mismatch compensation primitive from a buffer of the second module.

7. The method of claim 1, wherein the data burst comprises a variable amount of data.

8. A method, comprising: transmitting a data burst from a first module to a second module coupled via an interconnect compliant with a first processor interconnect protocol, comprising encapsulating the data burst with a first primitive having a first number of symbols and a second primitive having the first number of symbols; wherein the first processor interconnect protocol uses a second number of symbols to signal a beginning of a data burst and uses the second number of symbols to signal an end of the data burst, and wherein the first number of symbols is less than the second number of symbols.

9. The method of claim 8, wherein the first primitive comprises one of a start data primitive and a start error detection primitive.

10. The method of claim 9, further comprising resetting error detection logic at the first module and at the second module in response to the first module transmitting a start error detection primitive to the second module.

11. The method of claim 8, wherein the second primitive comprises one of an end data primitive and an end error detection primitive.

12. The method of claim 11, further comprising:
transmitting first error detection information formed using the data burst from the first module to the second module in response to the first module transmitting an end error detection primitive to the second module;
calculating second error detection information using the data burst at the second module; and
comparing the first and second error detection information to detect errors in the data burst.

13. The method of claim 8, further comprising:
periodically inserting a bitrate mismatch compensation primitive into the data burst; and
in response to the bitrate mismatch compensation primitive indicating that a bitrate frequency of the first module exceeds a bitrate frequency of the second module, removing at least one entry of the bitrate mismatch compensation primitive from a buffer of the second module.

14. The method of claim 8, wherein the data burst comprises a variable amount of data.

15. A device, comprising:
an interconnect compliant with a first processor interconnect protocol, comprising a transmitter module and a receiver module, the transmitter module comprising a controller to:
transmit a first primitive having a first number-of symbols to the receiver module;
transmit a data burst to the receiver module after transmitting the first primitive, wherein data from the data burst is absent from the first primitive; and
transmit a second primitive having the first number-of symbols to the receiver module in response to transmitting the data burst, wherein data from the data burst is absent from the second primitive;
wherein the first processor interconnect protocol uses a second number-of symbols to signal a beginning and end of a data burst and wherein the first number of symbols is less than the second number of symbols.

16. The device of claim 15, wherein the first primitive comprises one of a start data primitive and a start error detection primitive.

17. The device of claim 16, wherein the receiver module comprises error detection logic that is reset in response to the controller transmitting a start error detection primitive to the receiver module.

18. The device of claim 17, wherein the second primitive comprises one of an end data primitive and an end error detection primitive.

19. The device of claim 18, wherein:
the controller is further to transmit first error detection information formed using the data burst to the receiver module in response to the transmitter module transmitting an end error detection primitive to the receiver module; and
the error detection logic is further to:
calculate second error detection information using the data burst at receiver module; and
compare the first and second error detection information to detect errors in the data burst.

20. The device of claim 16, wherein:
the transmitter module is further to periodically insert a bitrate mismatch compensation primitive into the data burst; and
the receiver module is further to remove at least one entry of the bitrate mismatch compensation primitive from a buffer of the receiver module in response to an indication that a bitrate frequency of the transmitter module exceeds a bitrate frequency of the receiver module.

\* \* \* \* \*